United States Patent [19]

Thomas

[11] 4,335,038
[45] Jun. 15, 1982

[54] POLYCARBONATE CONTAINING A METAL PERFLUOROBORATE AND AN ORGANOSILANE AS IGNITION DEPRESSANTS

[75] Inventor: Lowell S. Thomas, Midland, Mich.

[73] Assignee: The Dow Chemical Company, Midland, Mich.

[21] Appl. No.: 191,207

[22] Filed: Sep. 26, 1980

[51] Int. Cl.$^3$ .......................... C08K 3/38; C08K 5/54
[52] U.S. Cl. .................................. 524/188; 524/265; 524/537; 524/404
[58] Field of Search .................. 260/29.1 SB, 45.7 R, 260/45.9 R, 45.8 AH; 528/901

[56] References Cited

U.S. PATENT DOCUMENTS

| | | | |
|---|---|---|---|
| 3,485,780 | 12/1969 | Sterman et al. | 260/37 SB |
| 3,909,489 | 9/1975 | Callander et al. | 260/45.7 R |
| 3,971,756 | 7/1976 | Bialous et al. | 260/45.7 R |
| 4,066,611 | 1/1978 | Axelrod | 260/45.7 R |
| 4,110,299 | 8/1978 | Mark | 260/37 PC |
| 4,208,489 | 6/1980 | Schmidt et al. | 260/45.7 R |
| 4,218,359 | 8/1980 | Marwitz et al. | 528/901 |
| 4,223,100 | 9/1980 | Reinert | 260/45.7 R |
| 4,269,762 | 5/1981 | Thomas et al. | 260/45.7 R |

Primary Examiner—John Kight, III
Assistant Examiner—R. A. White

[57] ABSTRACT

A polycarbonate such as a bisphenol-A homopolycarbonate containing amounts of a metal salt of perfluoroborate, e.g., the potassium salt of perfluoroborate and an organosilane, e.g., glycidoxypropyl trimethoxysilane, resists combustion upon exposure to a low temperature ignition source.

4 Claims, No Drawings

POLYCARBONATE CONTAINING A METAL PERFLUOROBORATE AND AN ORGANOSILANE AS IGNITION DEPRESSANTS

DESCRIPTION OF THE INVENTION

This invention relates to polycarbonates containing additives which inhibit combustion upon exposure of the polycarbonates to low temperature ignition sources.

Polycarbonates derived from reactions of dihydroxy-organic compounds, particularly the dihydric phenols, and carbonic acid derivatives such as phosgene have found extensive commercial application because of their excellent physical properties. These thermoplastic polymers appear to be particularly suitable for the manufacture of molded parts wherein impact strength, rigidity, toughness, heat resistance and excellent electrical properties are required.

Unfortunately, however, these polymers exhibit a brief but definite burning time when contacted with an open flame or comparable low temperature ignition source. More importantly, as is often the case, the polycarbonates contain stabilizers and other additives which are often more combustible than the unmodified polycarbonate. As a result, the modified polycarbonate frequently exhibits substantially poorer resistance to combustion than does the unmodified polycarbonate.

In attempts to increase the combustion resistance of polycarbonates including modified forms thereof, it has been a common practice to employ monomeric phosphites, phosphoric acid esters, thiophosphoric acid esters containing halogenated alkyl radicals and halogenated organic compounds into the polycarbonate. However, in order to obtain any noticeable improvement in combustion resistance, these additives have been employed in such large quantities that they often adversely affect many of the desirable physical and mechanical properties of the polycarbonate.

More recently, for example as taught in U.S. Pat. No. 3,919,167, various organo sulfonate salts have been employed as fire retardant additives for the polycarbonates. While these materials do not have a substantial deleterious effect on the physical properties of the polycarbonate, they generally must be employed in concentrations of at least one weight percent based on the polycarbonate in order to obtain a material that does not exhibit flaming drips upon combustion in accordance with Underwriter's Lab Standard Test UL-94.

In view of the deficiencies of conventional fire retardant polycarbonate compositions, it would be highly desirable to provide a polycarbonate composition having improved resistance to burning when exposed to a low temperature ignition source.

SUMMARY OF THE INVENTION

The present invention is a polycarbonate composition comprising a carbonate polymer having dispersed therein a metal perfluoroborate (hereinafter this salt shall be called "fluoroborate") and an organosilane. The fluoroborate salt is present in an amount sufficient to retard combustion when the composition is exposed to a low temperature ignition source. The organosilane is present in an amount sufficient to enhance the combustion retarding effect of the fluoroborate. Hereinafter, such composition shall be referred to as a fire retardant polycarbonate. The fire retardant polycarbonate of the present invention exhibits surprisingly high resistance to combustion and physical properties comparable to the carbonate polymer containing no fluoroborate and no organosilane.

The fire retardant polycarbonate of the present invention is suitably employed in most applications in which polycarbonates have been previously utilized. Applications of particular interest for the utilization of the fire retardant polycarbonates of this invention are as follows: automobile parts, e.g., air filters, fan housings, exterior components; housings for electrical motors, appliances, business and office equipment, photographic equipment, electrical switch boxes, electronic components, lighting and aircraft applications.

In general, such fire retardant polycarbonates are particularly useful in applications wherein the polycarbonate part is likely to be exposed to low temperature ignition sources.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the carbonate polymer may be derived from two or more different dihydric phenols or a copolymer of a dihydric phenol with a glycol or with a hydroxy or acid terminated polyester or with a dibasic acid in the event that a carbonate copolymer or interpolymer rather than a homopolymer is desired. Also suitable for the practice of this invention are blends of any one of the above carbonate polymers. Also included in the term "carbonate polymer" are the ester carbonate copolymers of the types described in U.S. Pat. Nos. 3,169,121 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The perfluoroborates suitably employed are those represented by the formula:

$$M(BF_4)_y$$

wherein M is a metal, preferably an alkali metal and y is a whole number equal to the valence of M. Preferably, M is sodium or potassium. Exemplary preferred fluoroborates include $KBF_4$ and $NaBF_4$, with $KBF_4$ being most preferred. The perfluoroborate salts are employed in particulate or powder form wherein the average particle diameter is preferably less than 5 micrometers, most preferably, less than one micrometer.

Methods for preparing the fluoroborate salts suitably employed in the practice of this invention are described in *Kirk-Othmer Encyclopedia of Chemical Technology*, 2nd Ed., Interscience Publishers, New York; J. H. Simons, Fluorine Chemistry, Vol. I, Academic Press, New York (1952); and R. Colton et al., *Halides of the Transition Elements-Halides of the First Row Transition Metals*, Wiley-Interscience, New York (1969).

The organosilanes that are suitably employed are those which enhance the ability of the fluoroborate to reduce combustion of the polycarbonate. Preferred organosilanes are those represented by the formula:

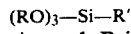

$(RO)_3—Si—R'$ wherein each R is independently alkyl, most preferably methyl and R' is a monovalent organic radical such as N-(aminoalkyl)aminoalkyl, glycidyloxy alkyl and other substituted alkyls. Examples of preferred organosilanes include N-(2-aminoethyl)-3-aminopropyl trimethoxy silane, 3-(glycidoxy)propyl trimethoxy silane and similar silane coupling agents.

The fire retardant polycarbonate of the present invention is suitably prepared by combining the carbonate polymer with effective amounts of fluoroborate and organosilane using any one of a variety of blending procedures conventionally employed for incorporating additives into carbonate polymer resins. For example, dry particulates of the carbonate polymer, the fluoroborate and organosilane may be dry blended and the resulting dry blend extruded into the desired shape.

While any amount of fluoroborate salt that imparts to the polycarbonate an improved resistance to ignition and/or combustion is suitable, preferred amounts of the fluoroborate salt are in the range from about 0.001 to about 2.0, especially from about 0.01 to about 0.2, weight percent based on the weight of the polycarbonate. Similarly, any amount of organosilane that enhances the ability of the fluoroborate to reduce combustion of the polycarbonate is suitably employed. Preferred amounts of the organosilane is from about 0.001 to about 2.0, most preferably from about 0.01 to about 0.2, weight percent based on the polycarbonate.

In addition to the aforementioned fluoroborate and organosilane, other additives may be included in the fire retardant polycarbonate of the present invention such as other fire retardant additives, fillers, pigments, dyes, antioxidants, stabilizers, ultraviolet light absorbers, mold release agents and other additives commonly employed in polycarbonate resin formulations.

The following examples are given to further illustrate the invention and should not be construed as limiting its scope. In the following examples, all parts and percentages are by weight unless otherwise indicated.

EXAMPLE 1

To a 10,000-g sample of a homopolycarbonate of bisphenol-A, having a weight average molecular weight ($M_w$) of 32,000 as determined by gel permeation chromatography and sold under the trade name Merlon M50F-1000 by Mobay Chemical, in the form of pellets (0.32 cm (dia)×0.32 cm (length)) is added 2.0 g of the potassium salt of perfluoroborate ($KBF_4$) and 5.0 g of N-(2-aminoethyl)-3-aminopropyl trimethoxysilane. These ingredients are dry blended and then dried at 250° F. for 4 hours. The resultant blend is extruded and repelletized in a single screw extruder equipped with a static mixer and operating at 525° F. The extruded pellets are redried at 250° F. for up to 4 hours. These redried pellets are molded into test bars (12.7 cm×1.27 cm×0.32 cm) using a screw type injection molding unit wherein the molding temperature is 575° F. The injection molded bars are tested for combustibility (oxygen index and fire retardance) and for optical properties (light transmission and haze). The results of these tests (Sample No. 1) are reported in Table I.

For the purposes of comparison, several additional blends (Sample Nos. 2–10) are prepared using different amounts of $KBF_4$ and different organosilanes. These blends are also tested and the results are reported in Table I. Also recorded in Table I are the combustibility and optical properties of a control sample (Sample Nos. $C_1$ and $C_2$) employing no fire retardant additive and comparative samples (Sample Nos. $A_1$–$A_8$) containing only one of the fluoroborate or the organosilane.

TABLE I

| Sample No. | Fluoroborate Amount[1], % | Organosilane[2] Type | Organosilane[2] Amt. | $O_2$ Index[3] % $O_2$ | Flame Retardance[4] Flame Time sec. | Flame Retardance[4] Rating | Light Transmission[5], % | Haze[6] % |
|---|---|---|---|---|---|---|---|---|
| 1 | 0.02 | 6020 | 0.05 | 38.9 | 4.3 | V-0 | 84.9 | 33.5 |
| 2 | 0.01 | " | " | 35.8 | 6.9 | V-2 | 86.6 | 14.1 |
| 3 | 0.03 | " | " | 38.9 | 4.4 | V-0 | 83.2 | 46.9 |
| $A_1$* | | " | 0.10 | 28.3 | 13.2 | V-2 | 87.5 | 9.6 |
| 4 | 0.01 | 2014 | 0.05 | 35.6 | 2.9 | V-0 | 86.7 | 17.5 |
| 5 | 0.02 | " | " | 37.1 | 3.2 | V-0 | 84.8 | 38.8 |
| $A_2$* | | " | 0.10 | 29.0 | 8.4 | V-2 | 88.1 | 3.1 |
| $C_1$* | | | | 26.9 | 15.7 | HB | 89.7 | 1.3 |
| $C_2$** | | | | 25.5 | 20.5 | HB | 82.3 | 1.1 |
| 6 | 0.01 | 6040 | 0.01 | 33.7 | 5.0 | V-2 | 82.9 | 9.2 |
| 7 | 0.03 | " | " | 35.6 | 4.4 | V-2 | 79.7 | 33.0 |
| 8 | 0.02 | " | 0.02 | 36.2 | 3.2 | V-0 | 81.5 | 21.5 |
| 9 | 0.03 | " | " | 36.8 | 4.0 | V-0 | 79.5 | 34.4 |
| 10 | 0.01 | " | 0.05 | 38.0 | 3.7 | V-0 | 81.8 | 9.8 |
| $A_3$* | 0.01 | | | 34.3 | 4.1 | V-2 | 82.7 | 9.7 |
| $A_4$* | 0.02 | | | 38.0 | 4.8 | V-2 | 80.1 | 23.6 |
| $A_5$* | 0.03 | | | 37.4 | 4.5 | V-2 | 79.2 | 34.5 |
| $A_6$* | | " | " | 32.3 | 9.9 | V-2 | 83.7 | 2.5 |
| $A_7$* | | " | 0.10 | 27.8 | 10.0 | V-2 | ND | ND |

TABLE I-continued

| Sample No. | Fluoroborate Amount[1], % | Organosilane[2] Type | Amt. | $O_2$ Index[3] % $O_2$ | Flame Retardance[4] Flame Time sec. | Rating | Light Transmission[5], % | Haze[6] % |
|---|---|---|---|---|---|---|---|---|
| $A_8$* | | " | 0.50 | 26.0 | 31.6 | HB | ND | ND |

*Not an example of the invention.
**Not an example of the invention, $C_2$ employs same polycarbonate as $C_1$ except that $C_2$ contains a tint formulation. $C_2$ is the polycarbonate used in preparing Sample Nos. 7-10 and $A_3$-$A_8$.
ND Not Determined.
[1] Amount - weight percent based on polycarbonate.
[2] 6020 - N-(2-aminoethyl)-3-aminopropyl trimethoxysilane

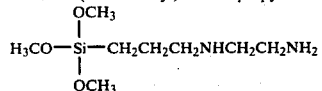

6040 - 3-(glycidoxy)propyl trimethoxysilane

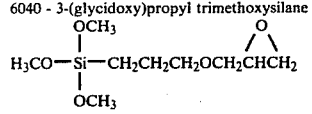

2014 - a silane-modified hexamethoxymethyl melamine which predominantly contains the reaction product of the following components 6040 defined hereinbefore and

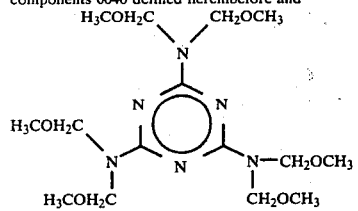

[3] ASTM D-2863-70.
[4] Underwriter's Laboratories Standard Test UL-94.
[5] ASTM D-1003-61.
[6] ASTM D-1003-61.

As evidenced by the data shown in Table I, the presence of organosilane in a polycarbonate containing a given amount of fluoroborate significantly improves the physical properties and/or reduces the tendency of the polycarbonate/fluoroborate composition to burn.

What is claimed is:

1. A composition comprising a carbonate polymer having dispersed therein an alkali metal perfluoroborate and an organosilane wherein the alkali metal perfluoroborate is employed in an amount sufficient to retard combustion when the composition is exposed to a low temperature ignition source and the organosilane is employed in an amount sufficient to enhance the ability of the alkali metal perfluoroborate to reduce the combustibility of the composition.

2. The composition of claim 1 wherein the perfluoroborate is potassium perfluoroborate.

3. A composition comprising a carbonate polymer, an alkali metal perfluoroborate and either N-(2-aminoethyl)-3-aminopropyl trimethoxysilane or 3-(glycidoxy)-propyl trimethoxysilane.

4. The composition of claim 1, 2 or 3 wherein the amount of perfluoroborate constitutes from about 0.001 to about 2 weight percent of the composition and the amount of an amino methoxy silane or glycidoxy methoxy silane constitutes from about 0.001 to about 2 weight percent of the composition.

* * * * *